United States Patent [19]

Cholvin

[11] 4,283,912
[45] Aug. 18, 1981

[54] TURBOCHARGER CONTROL

[75] Inventor: Robert L. Cholvin, Santa Monica, Calif.

[73] Assignee: The Garrett Corporation, Los Angeles, Calif.

[21] Appl. No.: 47,843

[22] Filed: Jun. 12, 1979

[51] Int. Cl.³ ............................................ F02B 37/00
[52] U.S. Cl. ........................................ 60/602; 251/28
[58] Field of Search ................ 60/600, 601, 602, 603; 251/28

[56] References Cited

U.S. PATENT DOCUMENTS

| 1,816,787 | 7/1931 | Moss ...................................... 60/602 |
| 2,621,472 | 12/1952 | Udale ..................................... 60/600 |
| 4,197,711 | 4/1980 | Fuhrmann et al. ..................... 60/602 |

FOREIGN PATENT DOCUMENTS 2823067  12/1978  Fed. Rep. of Germany ............. 60/600

Primary Examiner—Michael Koczo, Jr.
Attorney, Agent, or Firm—Stuart O. Lowry; Albert J. Miller

[57] ABSTRACT

A pneumatic control for turbochargers includes an evacuated bellows-operated servo valve for controlling the pressure differential across a diaphragm, which in turn controls the position of a turbocharger wastegate valve. Discharge pressure from a turbocharger compressor is applied to both sides of the diaphragm. The bellows-operated servo valve is operable to vent one side of the diaphragm whenever the discharge pressure exceeds a predetermined magnitude resulting in a pressure differential across the diaphragm to control the position of the waste gate valve.

6 Claims, 2 Drawing Figures

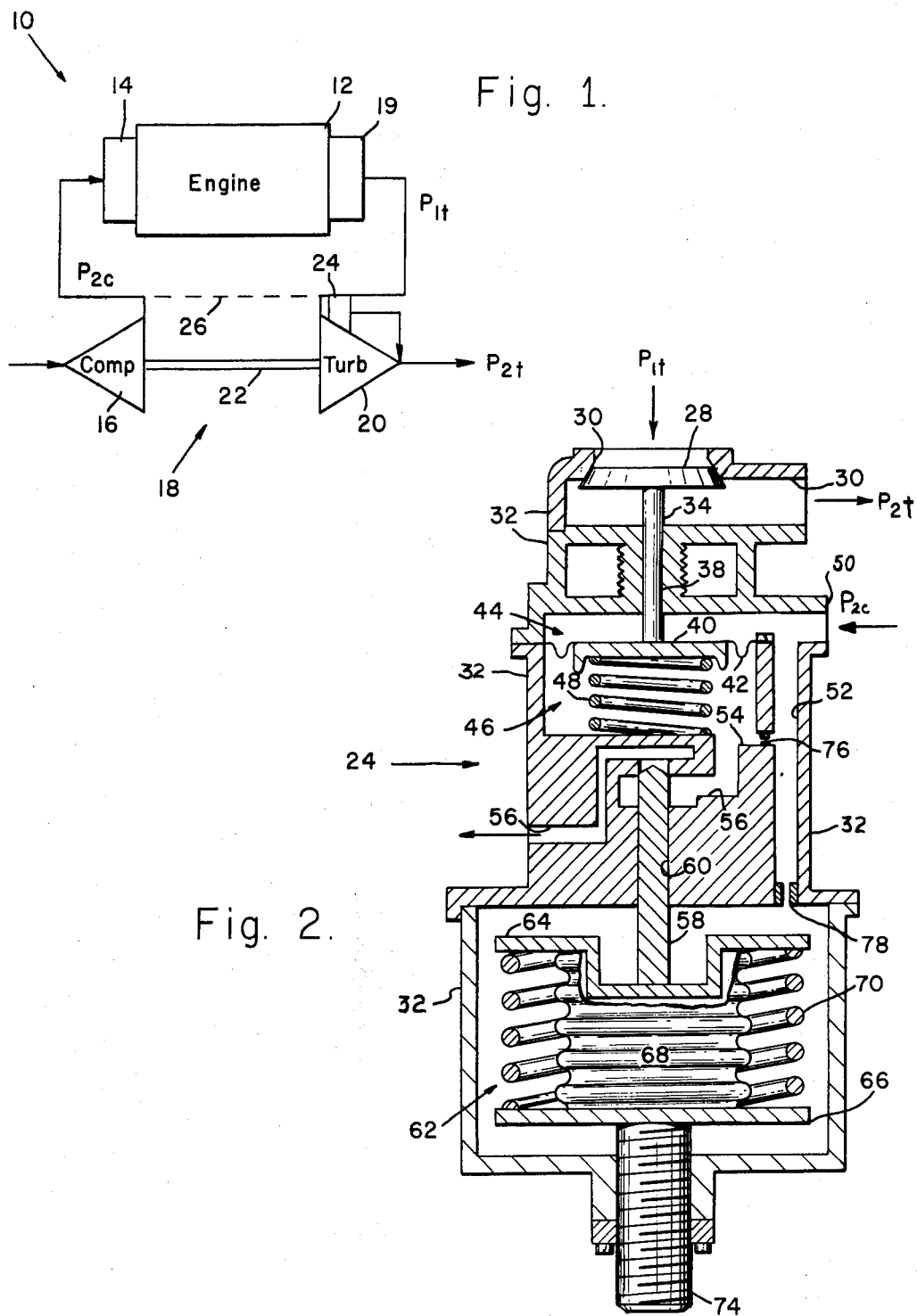

TURBOCHARGER CONTROL

BACKGROUND OF THE INVENTION

The invention of this application relates to the subject matter of concurrently filed application Ser. No. 47,842, entitled "Turbocharger Control", and filed in the name of Robert L. Cholvin.

This invention relates to devices for controlling the operation of a turbocharger. More specifically, this invention relates to a pneumatic control for controlling the rotational speed of a turbocharger turbine in response to the turbocharger compressor discharge absolute pressure.

Turbochargers in general are well known in the art, and comprise an exhaust gas driven rotating assembly for providing pressurized charge air to a combustion engine. More specifically, the turbocharger comprises a turbine rotatably driven by engine exhaust gases. The turbine is mounted on a common shaft with a compressor, and rotatably drives the compressor to supply high pressure charge air to the engine for increased power output.

In turbocharged engines, it is desirable to provide close control of the pressure, or boost level, of the charge air supplied to the engine. This is because the pressure of the charge air may, under certain operating conditions, exceed maximum pressure levels for safe engine operation. Alternately, the boost level output of the turbocharger may drop off under other operating conditions such as high altitude operation, resulting in a failure of the engine to operate at rated power. Accordingly, various turbocharger control devices have been developed seeking to prevent turbocharger overboost, while at the same time allowing engine operation under maximum rated conditions independent of altitude. See, for example, S.A.E. Technical Paper 546A, June 1962, entitled "Turbocharger Controls".

A wide variety of turbocharger controls are available throughout the prior art. Some of these prior art controls comprise so-called pressure differential-type controls wherein a control valve is operated by a diaphragm subjected to differential pressures. See, for example, U.S. Pat. Nos. 2,484,852; 4,075,849; and 4,120,156. However, these differential controls are disadvantageous in that they do not eliminate altitude sensitivity. Other turbocharger controls combine a bellows arrangement with the diaphragm to form a so-called pressure ratio control for operating a control valve. See, for example, U.S. Pat. Nos. 3,035,408; 3,102,382; 3,365,878; and 3,611,711. However, these pressure ratio controls also do not eliminate altitude sensitivity.

Some prior art turbocharger controls have been developed comprising so-called absolute pressure controls wherein a bellows arrangement is provided independently of a diaphragm for operating a control valve. See, for example, U.S. Pat. Nos. 1,816,787; 2,283,175; 2,573,231; 3,096,614; and 3,478,775. These absolute pressure controls are advantageous in that they control the turbocharger to maintain rated engine power independent of altitude. However, these prior art devices have relied for operation upon hydropneumatic systems utilizing a combination of pneumatic and hydraulic pressures. The inclusion of hydraulic fluid lines and the relatively high volume pumping requirements of an hydraulic fluid system results in a relatively expensive control scheme. Moreover, the potential leakage of the hydraulic fluid, typically high temperature engine lubricating oil, exposes the system to a substantially increased fire hazard as compared to an all-pneumatic system. Alternately, prior art absolute pressure devices have been proposed including bellows arrangements to operate a control valve independently of altitude and without the use of hydropneumatic pressure or equipment. However, these systems typically have required direct mechanical connection between the bellows arrangement and the control valve. Such mechanical connections have been found to increase system control error, as well as to introduce components subject to failure. Or, these systems have included electrical switching apparatus for coupling to the bellows arrangement, but such electrical equipment increases system fire hazard without increasing system reliability.

The invention of this application overcomes the problems and disadvantages of the prior art by providing an improved all-pneumatic absolute pressure control for turbochargers which avoids use of hydraulic fluid or components, and which substantially eliminates altitude sensitivity.

SUMMARY OF THE INVENTION

In accordance with the invention, a turbocharger wastegate valve is operably mounted with respect to the turbine housing of a turbocharger for controlling bypass of a portion of engine exhaust gases around the turbine. The wastegate valve is connected to a flexible diaphragm exposed on both sides to boost pressure from the turbocharger compressor, and is spring-biased to maintain the valve in a normally closed position. A servo valve responsive to compressor discharge absolute pressure operates to vent the compressor discharge air from one side of the diaphragm, and thereby selectively cause a pressure differential across the diaphragm urging the wastegate valve to an open position. The servo valve is operated by an evacuated bellows assembly subjected to compressor discharge pressure, and which compresses when the absolute value of compressor discharge pressure exceeds a predetermined magnitude to controllably vent the one side of the diaphragm.

BRIEF DESCRIPTION OF THE DRAWINGS

The accompanying drawings illustrate the invention. In such drawings:

FIG. 1 is a schematic diagram illustrating a turbocharged engine system; and

FIG. 2 is a somewhat schematic view of the absolute pressure control of this invention.

DETAILED DESCRIPTION OF THE PREFERRED EMBODIMENT

A turbocharged engine system 10 is shown in FIG. 1, and comprises a combustion engine 12 such as an internal combustion diesel or spark ignition engine for use with trucks, passenger cars, aircraft, or the like. The engine 12 includes an air intake manifold 14 which receives compressed charge air from a compressor 16 of a turbocharger 18. An appropriate fuel is suitably mixed with the air for combustion within the engine 12, and the exhaust products of combustion are exhausted via an exhaust manifold 19 to a turbine 20 of the turbocharger. The exhaust gases rotatably drive the turbine 20 which in turn rotatably drives the compressor 16 by means of a common connecting shaft 22. In this manner, energy is extracted from the engine exhaust gases for compressing and supplying compressed charge air to the engine.

During at least some modes of engine operation, the turbocharger 18 may function to supply the engine with charge air at a boost pressure level exceeding engine design limits. For this reason, a control 24 is mounted on the turbocharger 18, or alternately on the exhaust manifold 19, and includes a bypass valve (not shown in FIG. 1) for selectively bypassing a portion of the exhaust gases around the turbine. In this manner, the rotational speed of the turbine is controllably reduced resulting in a correspondingly reduced compressor speed and boost pressure level of the charge air. As shown, this control 24 is pressure-coupled directly to the compressor discharge ($P_{2c}$) by a pressure line 26, and thereby responds directly to the compressor discharge pressure for modulating turbocharger operation.

The control 24 of this invention is shown in detail in FIG. 2, and includes a poppet-type bypass valve 28 positioned for operably opening and closing a bypass opening 30 in a housing 32 mounted on the turbine (not shown in FIG. 2) of the turbocharger. The opening 30, when opened by the valve 28, allows bypass passage of a portion of the engine exhaust gases directly from the turbine inlet ($P_{1t}$) to the turbine outlet ($P_{2t}$) without driving communication with the turbine. In this manner, turbine speed and compressor boost pressure are limited and controlled in accordance with the modulated position of the valve 28.

The bypass valve 28 includes a valve stem 34 extending away from the valve opening 30 through the control housing 32. The stem 34 is slidably received through a housing seal portion 38, and has its opposite end connected to a plate 40 carried by a flexible diaphragm 42. The diaphragm 42 is mounted within an enlarged chamber within the controller housing 32 to divide the chamber into respective upper and lower diaphragm chambers 44 and 46 sealed from each other.

The bypass valve 28 is retained in a position normally closing the valve opening 30 by a spring 48 in the chamber 46 upwardly biasing the diaphragm 42 and the valve 28. In this manner, the control 24 functions to normally close the valve 28 whereby the turbocharger is allowed to develop maximum boost pressure. However, as will be explained, the diaphragm 42 is shifted when a maximum design charge air absolute pressure is achieved in order to modulate the valve 28 to an open position to limit the charge air pressure.

The two diaphragm chambers 44 and 46 are exposed to compressor discharge pressure ($P_{2c}$) by means of the pressure line 26 coupled to a port 50 on the control housing 32. This port opens directly into the upper chamber 44, and communicates with the lower chamber 46 via a passage 52 and a relatively small internal port 54. Importantly, this lower chamber 46 communicates with a vent passage 56 in the control housing 32 which is normally closed by a servo valve 58. Therefore, during normal or relatively low power operation of the engine, both sides of the diaphragm 42 are exposed to compressor discharge pressure. Since there is no flow through either chamber 44 or 46, the bypass valve 28 is retained in its normally closed position by the biasing spring 48.

In operation of the engine at relatively higher power levels, the servo valve 58 responds to compressor discharge absolute pressure ($P_{2c}$) to shift the diaphragm 42 downwardly as viewed in FIG. 2 to open the valve 28 when the compressor discharge absolute pressure exceeds a predetermined threshold. More specifically, as shown, the servo valve 58 extends away from the vent passage 56 through a valve passage 60. The servo valve 58 extends further into a bellows chamber 62 for suitable connection to an upper plate 64 of upper and lower plates 64 and 66 sandwiching a spring-bellows assembly comprising an evacuated bellows 68 and biasing spring 70. This bellows chamber 62 is exposed to compressor discharge pressure ($P_{2c}$) via the passage 52, and the bellows 68 and spring 70 respond to the pressure ($P_{2c}$) to collapse and thereby retract the servo valve 58 downwardly when the compressor discharge absolute pressure exceeds a specified value. Conveniently, this value may be selected and adjusted by means of a threaded extension 74 of plate 66 received through the control housing 32.

When the servo valve 58 is shifted downwardly, the vent passage 56 is opened. This allows a flow of compressor discharge air through the lower diaphragm chamber 46 to effectively reduce the pressure in this chamber 46 relative to the pressure in the upper chamber 44. This applies a pressure differential across the diaphragm 42 to shift the diaphragm downwardly to move the bypass valve 28 to an open position. Opening of the valve 28 allows bypass passage of a portion of the engine exhaust gases around the turbocharger turbine to reduce available turbine driving energy, and thereby also cause a leveling off of compressor discharge pressure. If, however, compressor discharge absolute pressure tends to increase to a magnitude above the predetermined threshold, the valve 28 modulates to open further and once again cause a leveling off of compressor discharge pressure to control said pressure within relatively narrow limits. Of course, as soon as the compressor discharge absolute pressure returns to a magnitude less than the threshold level, the bellows 68 and spring 70 expand to return the servo valve 58 to its closed position, and correspondingly return the bypass valve 28 to its normally closed position.

As shown in FIG. 2, a flow restrictor 76 is provided at the internal port 54 opening into the lower diaphragm chamber 46. In operation, when the servo valve 58 is opened, this flow restrictor 76 effectively orifices flow into the chamber 46 and thereby creates the flow-resultant pressure drop. If desired, a second flow restrictor 78 is provided at the entrance point of compressor discharge pressure into the bellows chamber 62. This flow restrictor 78 effectively orifices any flow into or out of the bellows chamber. In operation, since the bellows chamber 62 is otherwise sealed and not subjected to continuous flow, the restrictor 78 functions to dampen pressure variations in the bellows chamber to lend stability to the system.

If desired, the restrictors 76 and 78 may be replaced by a single restrictor (not shown) along the passage 52 upstream of both the diaphragm chamber 46 and the bellows chamber 62. This placement of a single restrictor reduces sensitivity of the control 24 to compressor discharge pressure fluctuations, and thereby increases stability with a corresponding increase in control error. However, increased stability with some increase in control error may be acceptable or desirable in some engine applications.

A variety of modifications and improvements in the control of this invention are believed to be apparent to those skilled in the art. For example, it is well known that the control 24 may be suitably mounted on the engine system exhaust conduits instead of directly upon the turbocharger 18. Moreover, the control housing 32 may be formed from any suitable number and configuration of sub-parts so as to form the various housing chambers, ports, and passages described herein. Accordingly, no limitation of the invention is intended by way of the foregoing detailed description, except by way of the appended claims.

What is claimed is:

1. In a turbocharger having an exhaust gas driven turbine, a pneumatic control comprising housing means having first and second chambers formed therein; valve means positioned within means forming a turbine bypass opening for diverting, when in an open position, a portion of the exhaust gas flow away from driving communication with the turbine to limit the absolute value of turbocharger boost pressure; a flexible diaphragm coupled to said valve means and dividing said first chamber into a pair of diaphragm chambers, said housing means further including a vent port communicating one of said diaphragm chambers to atmosphere; means for biasing said valve means to a normal position closing the bypass opening to prevent diverting of the gas flow; means for coupling said diaphragm chambers on opposite sides of said diaphragm and said second chamber to boost pressure; a servo valve movable to open and close said vent port; and an evacuated spring-bellows assembly mounted within said second chamber and responsive to the absolute value of boost pressure for moving said servo valve to open said vent port when the absolute value of boost pressure exceeds a predetermined magnitude, resulting in a flow through said one of said diaphragm chambers to provide a pressure differential across said diaphragm to overcome said biasing means and to move said valve means to an open position.

2. A pneumatic control as set forth in claim 1 wherein said biasing means comprises a spring for resiliently urging said valve means to a normally closed position.

3. A pneumatic control as set forth in claim 1 wherein said valve means comprises a valve member movable between said open and closed positions, and a valve stem connecting said valve member to said diaphragm, said valve stem extending from said diaphragm through the other of said diaphragm chambers.

4. A pneumatic control as set forth in claim 1 including flow restrictor means for orificing fluid flow into and out of said second chamber.

5. A pneumatic control as set forth in claim 1 including flow restrictor means for orificing fluid flow into said one of said diaphragm chambers, and into and out of said second chamber.

6. A pneumatic control as set forth in claim 1 wherein said coupling means comprises means for coupling the boost pressure to said pair of diaphragm chambers and to said second chamber in parallel with each other.

* * * * *